(12) United States Patent
Escowitz et al.

(10) Patent No.: US 11,192,314 B2
(45) Date of Patent: Dec. 7, 2021

(54) METHOD FOR HYBRID PREFORMS

(71) Applicant: Arris Composites Inc., Berkeley, CA (US)

(72) Inventors: Ethan Escowitz, Berkeley, CA (US); Riley Reese, Oakland, CA (US); Erick Davidson, Piedmont, CA (US); J. Scott Perkins, Oakland, CA (US)

(73) Assignee: Arris Composites Inc., Berkeley, CA (US)

( * ) Notice: Subject to any disclaimer, the term of this patent is extended or adjusted under 35 U.S.C. 154(b) by 0 days.

(21) Appl. No.: 17/123,198

(22) Filed: Dec. 16, 2020

(65) Prior Publication Data
US 2021/0187879 A1 Jun. 24, 2021

Related U.S. Application Data

(60) Provisional application No. 62/952,005, filed on Dec. 20, 2019.

(51) Int. Cl.
| | | |
|---|---|---|
| *B29C 70/50* | (2006.01) | |
| *B29C 70/54* | (2006.01) | |
| *B29C 70/46* | (2006.01) | |
| *B29K 105/08* | (2006.01) | |
| *B29K 77/00* | (2006.01) | |
| *B29K 69/00* | (2006.01) | |

(52) U.S. Cl.
CPC .......... *B29C 70/545* (2013.01); *B29C 70/465* (2013.01); *B29K 2069/00* (2013.01); *B29K 2077/00* (2013.01); *B29K 2105/0881* (2013.01)

(58) Field of Classification Search
CPC . B29C 70/545; B29C 70/465; B29K 2069/00; B29K 2077/00; B29K 2105/0881
See application file for complete search history.

(56) References Cited

U.S. PATENT DOCUMENTS

| | | | | |
|---|---|---|---|---|
| 4,051,290 | A * | 9/1977 | Jutte | B29C 43/02 428/168 |
| 9,511,550 | B2 * | 12/2016 | Mine | B29C 43/52 |
| 9,669,569 | B2 * | 6/2017 | Cathcart | B29C 33/10 |
| 2010/0028593 | A1 * | 2/2010 | Taketa | B32B 3/266 428/113 |
| 2010/0233423 | A1 | 9/2010 | Corden et al. | |
| 2010/0239856 | A1 * | 9/2010 | Olson | B32B 5/022 428/339 |

FOREIGN PATENT DOCUMENTS

| | | |
|---|---|---|
| EP | 2857607 A1 | 4/2015 |
| EP | 3369768 A1 | 9/2018 |

OTHER PUBLICATIONS

Authorized Officer Benoit Gasner, International Search Report and Written Opinion issued in related PCT Patent Application No. PCT/US2020/065194 dated Mar. 24, 2021.

\* cited by examiner

*Primary Examiner* — Jeffrey M Wollschlager
*Assistant Examiner* — Shibin Liang
(74) *Attorney, Agent, or Firm* — Kaplan Breyer Schwarz, LLP

(57) ABSTRACT

A hybrid preform comprises a bundle of unidirectionally aligned fibers, and at least one partial cut that extends part of the way, but not all of the way, through a transverse cross section of the bundle of fibers at least one location along the length of the bundle.

20 Claims, 5 Drawing Sheets

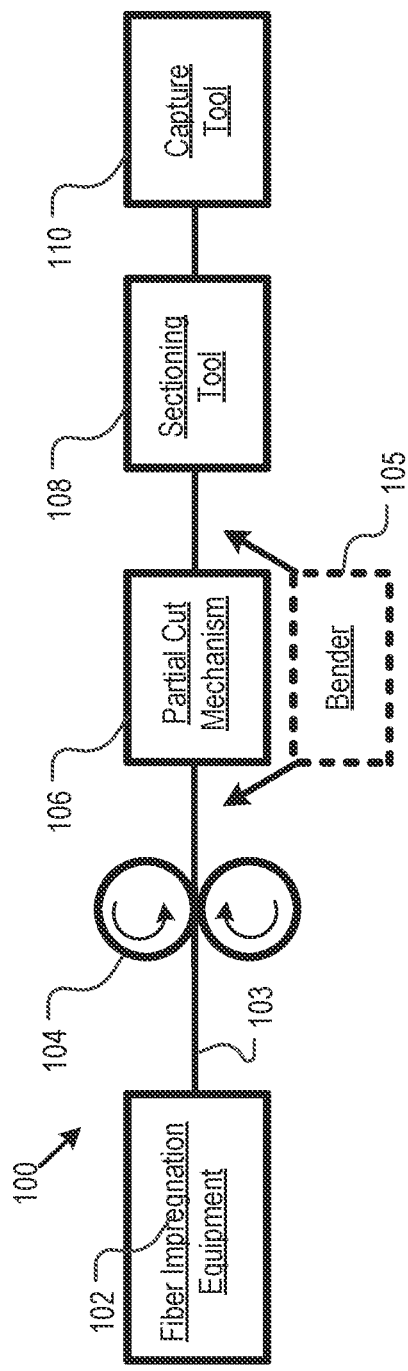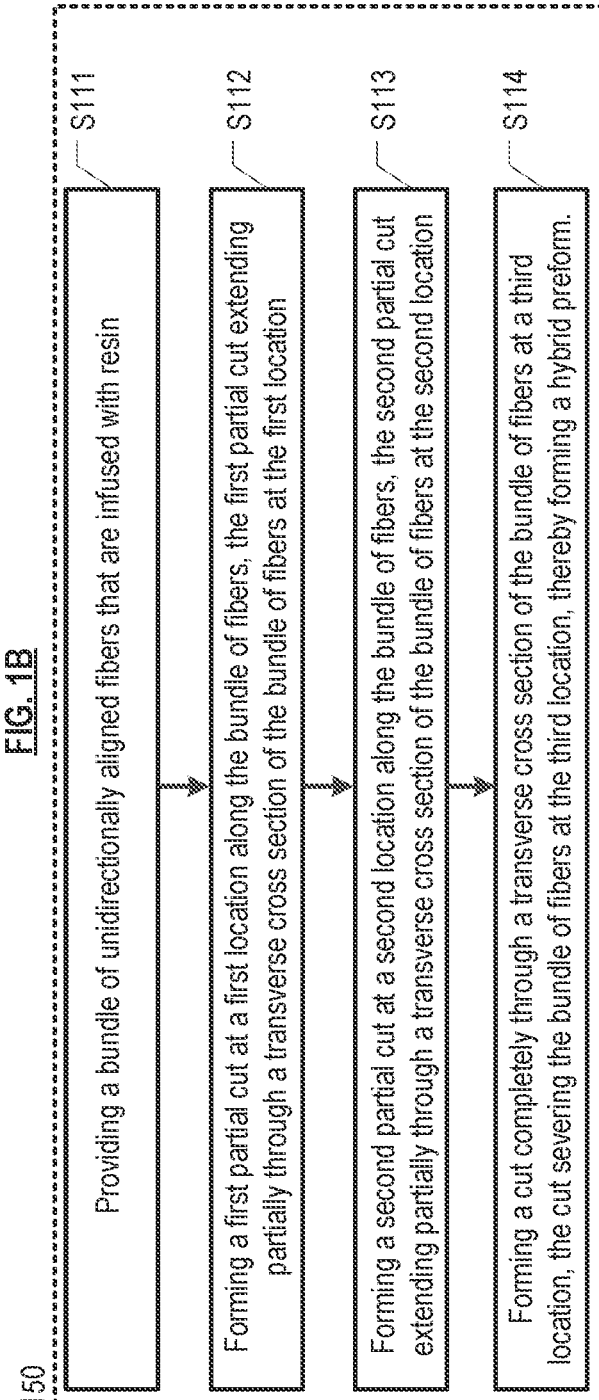

METHOD FOR HYBRID PREFORMS

STATEMENT OF RELATED CASES

This specification claims priority to U.S. Pat. App. Ser. No. 62/952,005, filed Dec. 20, 2019 and incorporated herein by reference.

FIELD OF THE INVENTION

The present invention relates to additive molding of fiber-composite materials.

BACKGROUND

It is desirable to fabricate parts from fiber-composite materials. A fiber composite part includes fibers dispersed within a matrix that is typically formed from a polymer resin. The matrix surrounds and supports the fibers, in addition to preventing abrasion and environmental attack thereof. The fibers impart their mechanical and physical properties to enhance those of the matrix. The combination is synergistic; the composite possesses material properties unavailable from the individual constituents, such as a very high strength-to-weight ratio.

Various methods exist for fabricating a part from fiber-composite materials. One such method is compression molding. In a typical compression-molding process, resin-impregnated fibers are placed in a mold. Depending on the geometry of the part being formed, and the stresses to which it will be subjected during use, either chopped fiber or continuous fiber is used. If the latter, the resin-impregnated continuous fiber is usually pre-formed into tape or sheets, and laid up (sheet-by-sheet, etc.) in the mold. In accordance with compression-molding protocols, the mold remains closed for a period of time, during which the resin-impregnated fibers are exposed to elevated temperature and pressure. The time under heat and pressure, which is usually a few minutes, ensures that the resin flows throughout the mold, filling any voids. After full consolidation of the fiber/resin as a consequence of elevated heat and pressure, the mold is cooled, at which time the resin hardens to produce a solid fiber-composite part.

Fabricating fiber-composites via compression molding presents certain challenges. It can be problematic, for example, to flow resin and fiber into portions of the mold having very small features. Additionally, although the resin matrix plays an important role in the integrity of the part, enhanced strength is due primarily to the presence of fibers. Consequently, if the fibers are not appropriately distributed throughout the part, the strength of the part can be compromised.

Applicant has developed methods for flowing fibers to specific regions of a compression mold, including flowing fibers into small features of the mold. This provides an unprecedented ability to precisely position the fibers within a part being fabricated, such as to achieve performance specifications. These methods involve creating pressure gradients to promote fiber flow. They also require placing specialized flow-specific preforms in specific locations within the mold cavity. Namely, the preforms are placed in the mold near to the intended destination of the fibers. Such preforms include fibers that are specifically sized to flow, and for their specific destination (e.g., a particular sized cavity, etc.).

Forming, and placing flow-specific preforms specific locations in accordance with applicant's earlier processes, is prohibitive in certain applications. For example, in applications in which the unit cost of a molded part must remain exceedingly low, the added process time of forming and placing flow-specific preforms in a mold cavity may unacceptably increase manufacturing costs.

SUMMARY

The present invention provides a way to flow fibers into small mold features without the need to create specialized flow-specific preforms and without the placement concerns of such preforms.

In accordance with the illustrative embodiment, applicant's fiber-bundle-based preforms are physically adapted to provide discrete regions of fibers that are capable of flowing under appropriate conditions. Such preforms are referred to herein as "hybrid" preforms. The use of such hybrid preforms to create flowable fibers differs from applicant's prior processes, wherein wholly distinct and separate flow-specific preforms are used.

In accordance with the illustrative embodiment, "hybrid" preforms are created by creating "partial cuts" in the preforms at one or more specific locations. A partial cut extends part of the way, but not all of the way, through a transverse cross section of a preform at one or more specific locations along its length. As a result of these one or more partial cuts, some fibers in the preform are reduced in length relative to uncut fibers, the latter having a length equal to the full length of the preform. In preferred embodiments, preforms are partially cut at one or more locations that, when the preforms are positioned within a mold cavity, are proximal to one or more features into which the cut fibers are intended to flow.

Consider a simple beam with a small boss protruding from one side. In applicant's previous methods, a preform layup for such a beam would entail (a) relatively larger preforms that are placed directly in the beam portion of the mold cavity, and relatively smaller preforms placed in the boss portion of the mold cavity, or (b) preforms placed into the beam and flow-specific preforms placed proximally to the boss. Embodiments of the invention, by contrast, place hybrid preforms in the beam, wherein one or more partial cuts in the hybrid preform are situated proximal to the boss. During molding, the discontinuous fibers resulting from the partial cut(s) will flow towards and in some cases into the boss, while fibers that extend the full length of the preform (i.e., fibers that have not been cut) will remain where originally placed in the mold cavity. Also, if the partial cut results in a segment of relatively short fibers and a segment of relatively long fibers (although still shorter than the continuous fibers extending the length of the hybrid preform), the relatively long fibers may not flow, or only flow to a minimal extent.

In some embodiments, a preform will include a single partial cut. In some other embodiments, a preform will include plural partial cuts. Defining a "continuous" fiber as a fiber that is equal in length to the preform from which it is sourced, a partial cut results in a "discontinuous" fiber. As a function of several factors, discontinuous fibers will flow towards various features of the mold cavity, whereas continuous fibers will not.

The present invention is particularly useful for the fabrication of any fiber-composite part that possesses features—typically small "sub-cavities" located near the periphery of the larger mold cavity (such as to form small protrusions, etc.)—whose volume can be filled by relatively small, flowed fibers. These small sub-cavities for producing small features have a volume that is less than about 5 percent of the overall volume of the mold cavity, and more typically less than about 1 percent of the overall volume of the mold cavity. Embodiments of the invention can also be used to create a desired fiber alignment in arbitrary regions within the mold cavity during the molding process, such as to regionally enhance the mechanical properties of a part being fabricated to address the expected in-use loads to which the part is subjected.

Embodiments of the invention provide economic benefits relative to applicant's prior processes that involve the feature-specific shaping of preforms, and placement of such preforms near to or in the features. Specifically, embodiments of the invention reduce process time through the efficient creation of hybrid preforms, rather than having to create flow-specific preforms. Also, using hybrid preforms in accordance with the present teachings reduces the quantity of preforms required for a part having small features. The present invention thus enables the flowing of fibers at a fraction of the cost of prior methods.

In some embodiments, the invention provides a method comprising: providing a bundle of fibers, wherein the fibers in the bundle are unidirectionally aligned and infused with resin, the bundle of fibers having a first end;

forming a first partial cut at a first location along the bundle of fibers, the first partial cut extending partially through a transverse cross section of the bundle of fibers at the first location;

forming a second partial cut at a second location along the bundle of fibers, the second partial cut extending partially through a transverse cross section of the bundle of fibers at the second location, wherein the first and second partial cuts are spaced apart from one another by a first length;

forming a cut that extends completely through a transverse cross section of the bundle of fibers at a third location, the cut severing the bundle of fibers at the third location, the severing resulting in a severed segment having a second length defined between third location and the first end, wherein the severed segment defines a hybrid preform, and wherein the hybrid preform includes the first partial cut and the second partial cut and wherein the fibers in the hybrid preform include:

(a) a first group of aligned fibers having the first length; and (b) a second group of aligned fibers having the second length.

In some embodiments, the invention provides a method comprising: positioning a hybrid preform in a mold cavity, the hybrid preform comprising a bundle of aligned fibers infused with resin, and having a first end, a second end, and at least one partial cut, the at least one partial cut extending partially through a transverse cross section of the bundle of fibers at the first location, wherein the at least one partial cut segregates the bundle of fibers into at least three groups of fibers, including:

(a) a first group of fibers that extend from the first end to the at least one partial cut, (b) a second group of fibers that extend from the second end to the at least one partial cut, and, (c) a third group of fibers that extend from the first end to the second end, wherein fibers in the first group are shorter than fibers in the second group;

melting the resin and subjecting the hybrid preform to pressure of at least about 100 pounds per square inch; and reducing pressure in a first region of the mold cavity, thereby causing fibers in the first group to flow toward the first region, wherein there is substantially no flow of fibers in the second group and the third group.

In some embodiments, the invention provides a system comprising:

a source of resin-infused, unidirectionally aligned bundle of fibers;

a partial-cut mechanism, wherein the partial-cut mechanism cuts part of the way, but not all of the way, through a transverse cross section of the bundle at a first location, which is a first distance from a first end of the bundle of fibers; and a sectioning tool that cuts all of the way through a transverse cross section of the bundle at a second location, the sectioning tool thereby severing the bundle of fibers at the second location defining a second end, and wherein the first location is between the first end and the second end, the severed bundle defining a hybrid preform.

BRIEF DESCRIPTION OF THE DRAWINGS

FIG. 1A depicts a process line for producing hybrid preforms in accordance with the illustrative embodiment.

FIG. 1B depicts a method in accordance with the illustrative embodiment of the invention.

DETAILED DESCRIPTION

Figure 1C:
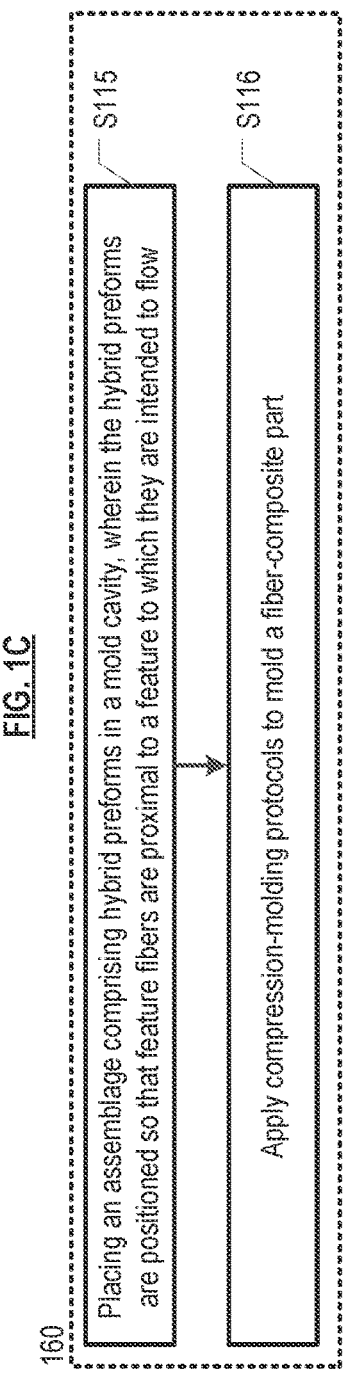
FIG. 1C depicts a method in accordance with the present teachings.

The following terms, and their inflected forms, are defined for use in this disclosure and the appended claims as follows:

"Fiber" means an individual strand of material. A fiber has a length that is much greater than its diameter. A fiber may be classified as being "continuous." Continuous fibers have a length that is no less than about 60 percent of the length of a mold feature or part feature where they will ultimately reside. Hence, the descriptor "continuous" pertains to the relationship between the length of a fiber and a length of a region in a mold or part in which the fiber is to be sited. For example, if the long axis of a mold has a length of 100 millimeters, fibers having a length of about 60 millimeters or more would be considered "continuous fibers" for that mold. A fiber having a length of 20 millimeters, if intended to reside along the same long axis of the mold, would not be "continuous." Such fibers are referred to herein as "short fibers." Short fiber, as the term is used herein, is distinct from "chopped fiber," as that term is typically used in the art. In the context of the present disclosure, all fibers, regardless of length, will be sourced from preforms. And substantially all of the (typically thousands of) fibers in a preform are unidirectionally aligned. As such, all fibers, regardless of length and regardless of characterization as "continuous" or otherwise, will have a defined orientation in the preform layup or preform charge in the mold and in the final part. Chopped fiber, as that term is used in the art, refers to fibers that, in addition to being short, have a random orientation in a mold and the final part.

"Fiber bundle" means plural (typically multiples of one thousand) unidirectionally aligned fibers.

"Tow" means a bundle of unidirectional fibers, ("fiber bundle" and "tow" are used interchangeably herein unless otherwise specified). Tows are typically available with fibers numbering in the thousands: a 1K tow (1000 fibers), 4K tow (4000 fibers), 8K tow (8000 fibers), etc.

"Prepreg" means fibers, in any form (e.g., tow, woven fabric, tape, etc.), which are impregnated with resin.

"Towpreg" or "Prepreg Tow" means a fiber bundle (i.e., a tow) that is impregnated with resin.

"Preform" means a segment of plural, unidirectionally aligned fibers. The segment is cut to a specific length, and, in many cases, will be shaped (e.g., bent, twisted, etc.) to a specific form, as appropriate for the specific part being molded. Preforms are usually sourced from towpreg (i.e., the towpreg is sectioned to a desired length), but can also be from another source of plural unidirectionally aligned fibers (e.g., from a resin impregnation process, etc.). The cross section of the preform, and the fiber bundle from which it is sourced, typically has an aspect ratio (width-to-thickness) of between about 0.25 to about 6. Nearly all fibers in a given preform have the same length (i.e., the length of the preform) and, as previously noted, are unidirectionally aligned. The modifier "fiber-bundle-based" or "aligned fiber" is often pre-pended, herein, to the word "preform" to emphasize the nature of applicant's preforms and to distinguish them from prior-art preforms, which are typically in the form of segments of tape or in the form of a shape cut from sheets of fiber. Applicant's use of the term "preform" explicitly excludes any size of shaped pieces of: (i) tape (typically having an aspect ratio, as defined above, of between about 10 to about 30), (ii) sheets of fiber, and (iii) laminates. Regardless of their ultimate shape/configuration, these prior-art versions of preforms do not provide an ability to control fiber alignment in a part in the manner of applicant's fiber-bundle-based preforms.

A "hybrid preform" is a preform that includes at least one partial cut through the transverse cross section of a preform.

A "partial cut" is a cut through a portion—but not all—of the transverse cross section of a preform. This results in some, but not all, of the fibers in the hybrid preform being discontinuous. The one or more partial cuts in a hybrid preform will appear at specific locations along the length thereof. When the hybrid preform is arranged in a layup in a mold, the one or more partial cuts will be proximal to one or more features into which the some of the discontinuous fibers resulting from the partial cut(s) are intended to flow.

A "cut end" of a hybrid preform refers to an end of the preform. The cut end typically results during the creation of a preform, wherein a cut is made completely through the transverse cross section of a towpreg feed. A preform, when in the form of simple straight or curved preform, will have two cut ends.

"Consolidation" means, in the molding/forming arts, that in a grouping of fibers/resin, void space is removed to the extent possible and as is acceptable for a final part. This usually requires significantly elevated pressure, either through the use of gas pressurization (or vacuum), or the mechanical application of force (e.g., rollers, etc.), and elevated temperature (to soften/melt the resin).

"Partial consolidation" means, in the molding/forming arts, that in a grouping of fibers/resin, void space is not removed to the extent required for a final part. As an approximation, one to two orders of magnitude more pressure is required for full consolidation versus partial consolidation. As a further very rough generalization, to consolidate fiber composite material to about 80 percent of full consolidation requires only 20 percent of the pressure required to obtain full consolidation.

"Preform Charge" means an assemblage of (fiber-bundle-based/aligned fiber) preforms or hybrid preforms that are at least loosely bound together ("tacked") so as to maintain their position relative to one another. A preform charge may comprise a mixture of hybrid preforms and preforms, with no limitation on the minimum or maximum number of either type. Preform charges can contain a minor amount of fiber in form factors other than fiber bundles, and can contain various inserts, passive or active. As compared to a final part, in which fibers/resin are fully consolidated, in a preform charge, the hybrid/preforms are only partially consolidated (lacking sufficient pressure and possibly even sufficient temperature for full consolidation). By way of example, whereas a compression-molding process is typically conducted at about 150-300 psi (which will typically be the destination for a preform charge in accordance with the present teachings), the downward pressure applied to the preforms to create a preform charge in accordance with the present teachings is typically in the range of about 10 psi to about 100 psi. Thus, voids remain in a preform charge, and, as such, the preform charge cannot be used as a finished part.

A "feature" of a mold cavity (or molded part) is a relatively small region of a mold cavity (or molded part) that has a form/shape that varies from that of the mold cavity (or molded part) at large.

"Non-flowing," when referencing a fiber, means that no portion of the fiber is substantially displaced, during molding, from its original position/location in a mold cavity.

"Flowing," when referencing a fiber, means that at least some portion of the fiber is substantially displaced, during molding, from its original location in a mold cavity.

A "non-feature fiber" is a fiber that has at least one end that is not substantially displaced, during molding, from its original location in a mold cavity.

A "feature fiber" is a fiber in which both ends are usually, but not necessarily, displaced during molding from an initial/original location in a mold cavity, and wherein such displacement either:

(i) positions at least a portion of the fiber in a feature; or (ii) positions a fiber in a predetermined orientation/alignment at a discrete region within the mold cavity.

"Compatible" means, when used to refer to two different resin materials, that the two resins will mix and bond with one another.

"Stiffness" means resistance to bending, as measured by Young's modulus.

"Tensile strength" means the maximum stress that a material can withstand while it is being stretched/pulled before "necking" or otherwise failing (in the case of brittle materials).

"About" or "Substantially" means +/−20% with respect to a stated figure or nominal value.

Embodiments of the invention pertain to hybrid fiber-bundle-based preforms. Each such hybrid preform includes many individual, unidirectionally aligned fibers, typically in multiples of a thousand (e.g., 1 k, 10 k, 24 k, etc.). The fibers align with the major axis of their host preform. Whereas applicant's processes typically utilize fiber-bundle-based preforms in which substantially all fibers in a preform are the same length, that is not the case for the hybrid preforms disclosed herein.

Specifically, in addition to including fibers having a length that defines the length of the preform (i.e., extends for the full length of the preform), hybrid preforms in accordance with the present teachings also include one or more groups of fibers specifically sized for: (1) flow and (2) their intended destination. Fibers within any one group all have a length that is substantially equal, but fibers in any one group may have a length that is different from those in another group, and will be shorter than the "continuous" fibers defining the full length of the preform.

Hybrid Preform Composition. Hybrid preforms suitable for use in conjunction with the invention include a plurality of resin-impregnated fibers. The source of resin-impregnated fibers can be either spooled towpreg, or directly from a resin-impregnation process.

The individual fibers in the hybrid preform can have any diameter, which is typically, but not necessarily, in a range of about 1 to about 100 microns. Individual fibers can include an exterior coating such as, without limitation, sizing, to facilitate processing, adhesion of binder, minimize self-adhesion of fibers, or impart certain characteristics (e.g., electrical conductivity, etc.). It is notable, however, that as fiber thickness increases, the ability to flow a fiber into a small cavity may be compromised. This is particularly true if entering the cavity requires the fiber to bend to some degree. As such, there is a preference, but not a requirement, for relatively thinner-diameter fibers, such as those in the range of about 1 to about 20 microns, in hybrid preforms in accordance with the present teachings.

Each individual fiber can be formed of a single material or multiple materials (such as from the materials listed below), or can itself be a composite. For example, an individual fiber can comprise a core (of a first material) that is coated with a second material, such as an electrically conductive material, an electrically insulating material, a thermally conductive material, or a thermally insulating material.

In terms of composition, each individual fiber can be, for example and without limitation, carbon, glass, natural fibers, aramid, boron, metal, ceramic, polymer filaments, and others. Non-limiting examples of metal fibers include steel, titanium, tungsten, aluminum, gold, silver, alloys of any of the foregoing, and shape-memory alloys. "Ceramic" refers to all inorganic and non-metallic materials. Non-limiting examples of ceramic fiber include glass (e.g., S-glass, E-glass, AR-glass, etc.), quartz, metal oxide (e.g., alumina), alumina silicate, calcium silicate, rock wool, boron nitride, silicon carbide, and combinations of any of the foregoing. Furthermore, carbon nanotubes can be used. Hybrid yarns consisting of twisted or commingled strands of fibers and polymer filaments can also be used as preforms.

Resins suitable for use in conjunction with the embodiments of the invention include any thermoplastic. Exemplary thermoplastic resins include, without limitation, acrylonitrile butadiene styrene (ABS), nylon, polyaryletherketones (PAEK), polybutylene terephthalate (PBT), polycarbonates (PC), and polycarbonate-ABS (PC-ABS), polyetheretherketone (PEEK), polyetherimide (PEI), polyether sulfones (PES), polyethylene (PE), polyethylene terephthalate (PET), polyphenylene sulfide (PPS), polyphenylsulfone (PPSU), polyphosphoric acid (PPA), polypropylene (PP), polysulfone (PSU), polyurethane (PU), polyvinyl chloride (PVC). Additionally, thermoset resins can be used as well.

It is notable, however, that thermoplastics having relatively lower viscosity (in their melt form) are preferred for use in conjunction with embodiments of the invention. By way of non-limiting examples, polycarbonate and nylons, such as polyamide-6, have a relatively lower melt viscosity and are a particularly suitable choice for flowing fibers. Of course, the resin must be a suitable choice in terms of the material properties of the composite part being fabricated. On the other hand, polyphenylene sulfide (PPS) has a relatively high melt viscosity and is a less-preferred resin for flowing fibers. Resins have a melt viscosity of less than about $1 \times 10^4$ Pascal seconds are preferred for use in conjunction with embodiments of the invention.

FIG. 1A depicts system 100 for producing hybrid preforms in accordance with the present teachings. The system includes fiber-impregnation equipment 102, tensioning rollers 104, partial cut mechanism 106, sectioning tool 108, and capture tool 110. Although not a required element of the present invention, system 100 includes optional bender 105. Often, it is desirable to bend preforms to conform to the shape of a mold cavity, and bender 105 provides this capability. The operational flow of system 100 is from left to right in FIG. 1A.

FIG. 1B depicts method 150 in accordance with the present teachings. Method 150, which includes operations S111 through S114, is used to manufacture a hybrid preform, such as in conjunction with system 100.

Operation S111 recites providing a bundle of unidirectionally aligned fibers that are infused with resin. This is accomplished via fiber-impregnation equipment 102. Any process for impregnating raw fiber with resin (typically thermoplastic resin) may suitably be used. Such a process dispenses with a spooling step otherwise required during the process of creating towpreg. This permits the various cutting operations for creating a hybrid preform to be performed immediately after newly formed towpreg has cooled. Description of the fiber-impregnation process, as implemented by fiber impregnation equipment 102, examples of which process and equipment are well known to those skilled in art, are omitted to maintain the focus on what is germane to embodiments of the present invention. In some other embodiments, spools of towpreg replace fiber impregnation equipment 102 as the feed for producing the hybrid preforms.

After impregnation, the resulting towpreg 103 is quickly cooled (passively and/or actively) and pulled through rollers 104 that place the towpreg under tension for movement through system 100.

Once the cooled towpreg 103 has passed through rollers 104, a timed actuation of partial-cut mechanism 106 fractionally severs a portion of the fibers through the towpreg's transverse cross section, at appropriate locations. This is recited in operations S112 and S113 of method 150.

Partial-cutting, as performed by partial-cut mechanism 106, can be accomplished in any number of ways. For example, in some embodiments, towpreg is pulled through two stacked rollers with a precise gap between them (i.e., a rotary die). A blade protruding a precise height off the surface of one roller would sever fibers only up to its height, which is less than the roller gap. In some other embodiments, the towpreg is constrained in a fixture and passed through a spinning circular blade. In the same way that a table saw set to a height less than a board's thickness would only cut a channel in the board, rather than cutting the board in half, the rotary blade only sever fibers in a portion of the transverse cross section of the towpreg. In yet some further embodiments, a slicing aperture mechanism is used to cut the outer fibers of towpreg to a desired depth. Thus, the partial-cut mechanism can be a rotary blade, a reciprocating blade, an ultrasonic blade, or the like. It is within the capabilities of those skilled in the art to make and use partial-cut mechanism 106.

The specifics of the partial cuts made in the towpreg depend on the geometry of the (typically small) feature of a mold-cavity. That is, a feature, such as a small cavity, will have a specific size and overall volume, and the partial cuts are controlled (depth and timing) to provide a suitable amount of fibers of a suitable length for filling the feature. More particularly, the length of fibers in a partially cut section can be determined by the longitudinal spacing of the paired partial-cutting operations (along the major axis of the towpreg). Further, the depth of the partial cuts determines the quantity of fibers in the cross section that is severed. Combining the length and depth parameters determines the volume of fibers that will flow.

One or more "segments" resulting from such partial cuts will collectively provide a volume of fiber/resin sufficient to fill the volume of the feature (present as a small cavity in the larger mold cavity). Typically, the fractional volume of the feature that a segment provides is in inverse relation to the number of segments that are intended to collectively supply the full volume of the feature. In other words, if the design of a hybrid preform provides two segments to supply the fiber/resin required to fill the volume of the feature, each will typically provide 50 percent of the volume; if four segments, 25 percent of the volume per segment, etc. When the hybrid preforms are placed in the mold cavity, one or more segments resulting from the partial cut(s) are placed proximal to the feature(s) of interest, so that during molding operations, the short fibers of that segment(s) will toward and/or into the feature(s).

In use during molding operations, it will be desirable for some fibers to flow into the small cavity that creates a small feature, whereas it will be desirable for other of the fibers to flow just sufficiently to provide some overlap between the fibers in the small cavity and the fibers in the main regions of the mold cavity. This can be accomplished, in some embodiments, as follows.

The partial cuts (in preforms) that will be positioned in a mold cavity closest to a feature of interest should be relatively more closely spaced to one another (to provide shorter fiber segments) and relatively deeper (resulting in a relatively greater number of such fibers), thereby providing a significant volume of fibers (consistent with feature volume) that will very readily flow to the feature. The partial cuts on the same preform or adjacent preforms that are further from the feature of interest should be relatively further apart (resulting in longer fiber segments) and relatively shallower (resulting in a relatively lesser number of cut fibers), providing a relatively smaller volume of relatively longer (but still flowable) fibers. These relatively longer, flowable fibers will flow to a lesser extent than the shorter fibers to link the initially flowed short fibers to the rest of the part via overlap. Although longer than the initially flowed short fibers, these somewhat longer fibers are nevertheless shorter than the uncut fibers in the hybrid preform. Depending on the mold geometry proximal to a given feature, the partially cut preforms can also take on a variety of geometric form factors for better nesting (e.g., square, oval, rectangular, etc.)

After towpreg 103 passes through partial cutting, it is sectioned via inline sectioning tool 108. Sectioning involves two cuts completely through the towpreg feed, thereby defining a (hybrid) preform. More precisely, the hybrid preform will have two cut ends, but since the hybrid preform is created at the end of the towpreg, only one cut is required to sever it from the bulk of the towpreg. In the illustrative embodiment, the cutting mechanism of the sectioning tool is stationary, and yields preforms of a desired length via timed actuation. That is, the cuts are timed relative to the linear movement of the towpreg. The cutting operation transitions the partially-cut towpreg into hybrid preforms by severing the entirety of fibers through the transverse cross section. This is recited in operation S114 of method 150. What results are hybrid preforms; that is, distinct segments of towpreg having partial cuts, where necessary, along the length thereof.

Capture tool 110 receives the hybrid preforms (and any "normal" preforms). In some embodiments, capture tool 110 is a tray, which may be partitioned for the purpose of grouping together hybrid preforms having the same configuration. The captured hybrid preforms are then cataloged.

In some other embodiments, capture tool 110 serves a dual purpose. Specifically, in addition to receiving the hybrid preforms, capture tool 110 is used to organize them into a unitary bound-together assemblage that may later be placed directly, and in a single operation, into a mold cavity. This is assemblage is referred to as a "preform charge," and is now described further below.

A preform charge comprises one or more fiber-bundle-based preforms (hybrid or otherwise) that are tacked (joined) together. The preform charge, which is typically a three-dimensional arrangement, is usually created in a fixture separate from the mold proper, and which is dedicated and specifically designed for that purpose. To create a preform charge, one or more preforms are placed (either automatically or by hand) in a preform-charge fixture, which, as appropriate, may be in the form of a mold cavity. By virtue of the configuration of the fixture, the preforms are organized into a specific geometry and then tacked together. Tacking can be performed by heating the preforms (the weight of the preforms on one another provides sufficient compressive force for the tacking operation). Other techniques for tacking/joining include ultrasonic welding, friction welding, lasers, heat lamps, chemical adhesives, and mechanical methods such as lashing.

After tacking, the preform charge is not fully consolidated. However, once the preforms are joined, they will not move, thereby maintaining the desired geometry and the specific alignment of each preform in the assemblage. The shape of the preform charge usually mirrors that of an intended part, or a portion of it. See, e.g., Publ. Pat. App. US2020/0114596 and U.S. patent application Ser. No. 16/877,236, incorporated herein by reference.

The preform charge provides a number of benefits relative to individually "laying up" preforms one-by-one into a mold cavity. In particular, creating a preform charge is time efficient, relative to individually moving preforms from intermediate storage to a mold cavity. Moreover, once a mold is closed, there is no ability to verify that the loosely stacked/arranged preforms in a layup maintain their desired position relative to other preforms and relative to the mold. Since the preforms in a preform charge are bound together, they are unable to shift position relative to one another. Furthermore, since the shape of the preform charge usually corresponds to the shape of the mold cavity or a portion of it, the preform charge has very little ability to shift its position. In fact, the preform charge can be formed with registration features, if necessary, to ensure that it will not move once placed in a mold cavity.

Although the preform charge is usually the preferred form of the feed for applicant's compression-molding processes, hybrid preforms in accordance with the present teachings can also be individually placed in a mold cavity to form a layup. As used in this disclosure and the appended claims, the term "assemblage including hybrid preforms" refers to either a "preform charge" including hybrid preforms, or a "layup" that includes hybrid preforms, unless otherwise indicated. The aforementioned assemblage can also include applicant's standard preforms (i.e., preforms without partial cuts).

In some embodiments, capture tool 110 is a preform-charge fixture, wherein preforms, either hybrid or otherwise, produced via system 100, are appropriately placed in the fixture for the preparation of a preform charge. This placement operation can be conducted manually (which still provides time savings relative to hand lay-up in a mold cavity) or in automated fashion, such as by a pick-and-place tool. In some other embodiments, at least some of the partial cuts formed in the towpreg are made after a preform charge is created. In such embodiments, capture tool 110 incorporates a partial-cut mechanism, or a second partial cut mechanism is positioned downstream of capture tool 110.

After the hybrid preforms are collected, and/or a preform charge comprising hybrid preforms is produced, the hybrid preforms or preform charge(s) comprising hybrid preforms can be: (1) stored for later use to form a fiber-composite part, (2) immediately placed in a mold cavity to fabricate a fiber-composite part, or (3) shipped to another facility/entity to fabricate a fiber-composite part.

If bent (as opposed to straight) hybrid preforms are desired for use in conjunction with a particular molding application, system 100 of FIG. 1A can incorporate a bending machine, such as bender 105. As desired, the bending machine can be located upstream or downstream of partial cut mechanism 106. Moreover, bending can occur either upstream or downstream of sectioning tool 108. Bending can be performed using a robot and fixture about which the towpreg is bent, etc., or in other ways known to those skilled in the art.

In some further embodiments, partial cuts can be performed by a mechanism associated with bender 105. In fact, some embodiments of a bender include a sectioning tool. Appropriately controlled, the sectioning tool can be used to form the requisite partial cuts.

In the illustrative embodiment, system 100 operates as a continuous; however, in some other embodiments, with slight modifications, the system operates as a batch process. For example, if the impregnated fiber that is produced via fiber impregnation equipment 102 is spooled, fiber can be drawn from the spool in discontinuous fashion. This can be advantageous for implementing the partial cuts.

FIG. 1C depicts method 160 for forming a fiber-composite part using hybrid preforms.

Operation S115 of method 160 recites placing an assemblage comprising hybrid preforms into a mold cavity. As previously, discussed, the assemblage can be either one or more preform charges, or a layup comprising hybrid preforms that is formed in the mold cavity. In operation S116, compression-molding protocols are used to fabricate a fiber-composite part using the assemblage of hybrid preforms. More particularly, compression molding is conducted at a temperature that is typically in the range of about 150° C. to about 400° C., as a function of the melting temperature of the thermoplastic resin being used. Typical compaction pressure is between 1000 to 3000 psi. Elevated temperature and pressure is maintained for a few minutes, followed by cooling.

As implied above, in some situations, different entities perform method 150 and method 160. That is, a first entity may fabricate the hybrid preforms at a first facility via method 150, and then ship the hybrid preforms, via a suitable container (advantageously with serialization), to a second entity at a second facility for manufacturing a fiber-composite part using the hybrid preforms via method 160. Alternatively, a single entity could perform both methods, either at separate times (i.e., fabricate the hybrid preforms and then, at a later time, fabricate a fiber-composite part) or as a combined process (i.e., fabricate the hybrid preforms, form an assemblage, then fabricate a fiber-composite part).

Figure 2A:
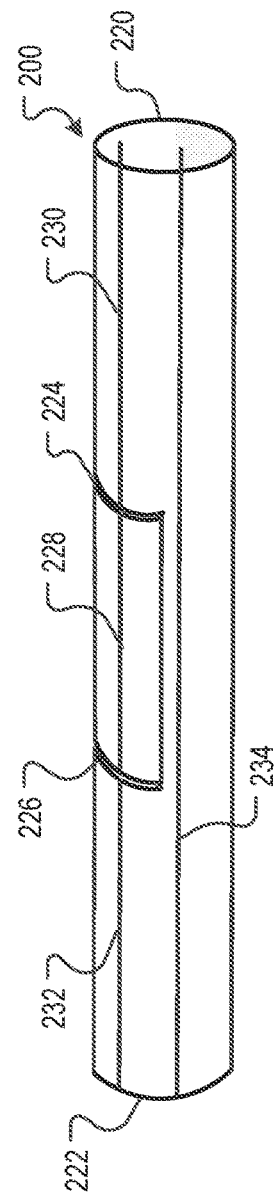
FIG. 2A depicts a hybrid preform in accordance with the illustrative embodiment.

FIG. 2A depicts a view of hybrid preform 200, having cut ends 220 and 222 and two partial cuts 224 and 226. With reference to FIG. 1A, the cuts ends are formed via sectioning tool 108, and the partial cuts are formed using partial cut mechanism 106. The partial cuts create (a) discontinuous fibers 228, which are defined between the two partial cuts 224 and 226, (b) discontinuous fibers 230, which are defined between cut end 220 and partial cut 224, and (c) discontinuous fibers 232, which are defined between partial cut 226 and end cut 222. Hybrid preform also includes continuous fibers 234. It is to be understood that many (c.a., thousands) of each of such groups of fibers are typically present in hybrid preform 200; one representative of each group is shown in FIG. 2A for clarity.

Figure 2B:
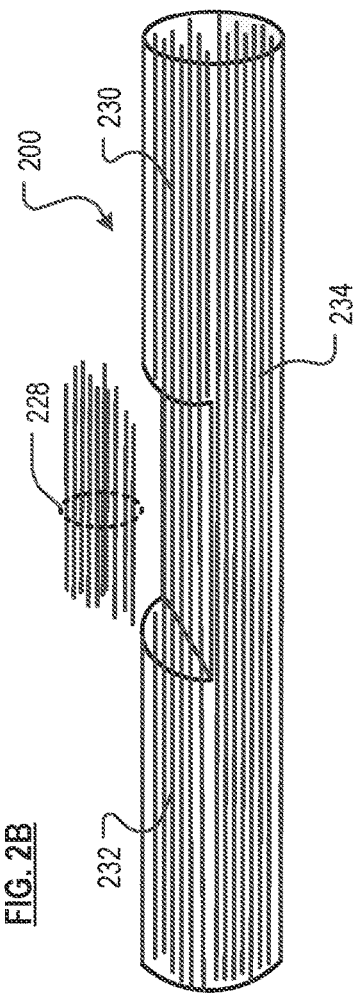
FIG. 2B depicts a portion of the fibers of the hybrid preform of FIG. 2A flowing during molding operations.

FIG. 2B depicts a stylized representation of the displacement of the fibers 228 during molding. The resin matrix material in hybrid preform 200 keeps fibers 228 within the preform after the partial cuts have been made and prior to molding operations. But once the resin melts during molding, and compaction pressure is applied, the severed fibers 228 are free to separate from preform 200. They are prompted to flow in a desired direction via an engineered pressure gradient, such as is created by venting the feature into which fibers 228 are intended to flow.

Processing techniques used during molding can also be employed to optimize fiber flow. For example, by situating, on the top of a preform charge, partially cut preforms proximal to a feature, and subsequently applying more heat to the upper mold half, the flow of the partially cut fibers into the feature is promoted sooner than would otherwise be the case (i.e., the associated resin melts first due to the temperature gradient). Such a technique helps maintain the fiber alignment of the fibers that do not flow, which are situated below the partially cut preforms in the preform charge. Alternatively, such a technique can similarly be used at fiber intersections, in which partially cut preforms proximal to the intersection flow around continuous (non-flowing) fibers as a means of reinforcement.

The use of hybrid preforms in accordance with the present teachings results in different classes of fibers, as a function of several factors. The fibers fall into two major groups: "feature" fibers, which are fibers that are intended to flow at least partially into small features, and "non-feature" fibers, which are not intended to do so. Factors that influence the classification of any given fiber include:

(i) for a hybrid preform in a mold cavity, the proximity of a cut end or a partial cut to a feature, and (ii) the extent to which a discontinuous fiber (resulting from at least one partial cut) is constrained, such as by virtue of its immediate environment or, to a lesser degree, its length (a relatively longer length fiber is more constrained than a relatively shorter length fiber, simply by virtue of its length).

Both factors (i) and (ii) pertain to the likelihood that a fiber will flow from its initial location in the mold cavity to a different location, such as to the location of a feature. Other factors that affect the ability of a fiber to flow or enter a small feature include the viscosity of the resin in its melt-flow state, and the diameter of the fiber.

Fibers that are to be flowed to a feature typically have a length in the range of about 5 to 100 mm in length. Their final alignment, as results from molding operations, is subject to fluid dynamics that govern their flow in the liquefied resin. The fibers that do not flow to a feature remain in place for the most part (there is no significant displacement due to the pressure gradient). Fibers that do not flow can be of any length, shape, and/or orientation in the mold cavity.

With respect to factor (i), in applicant's mold designs, small features are vented to reduce the pressure in the vicinity thereof, prompting appropriately sized and positioned fibers to flow towards and into such features. As to factor (ii), if fibers are constrained, such as by the presence of other fibers, there is less tendency for such constrained fibers to flow. These factors are further illustrated in conjunction with FIG. 3A, which also illustrates the various classes of fibers.

Figure 3A:
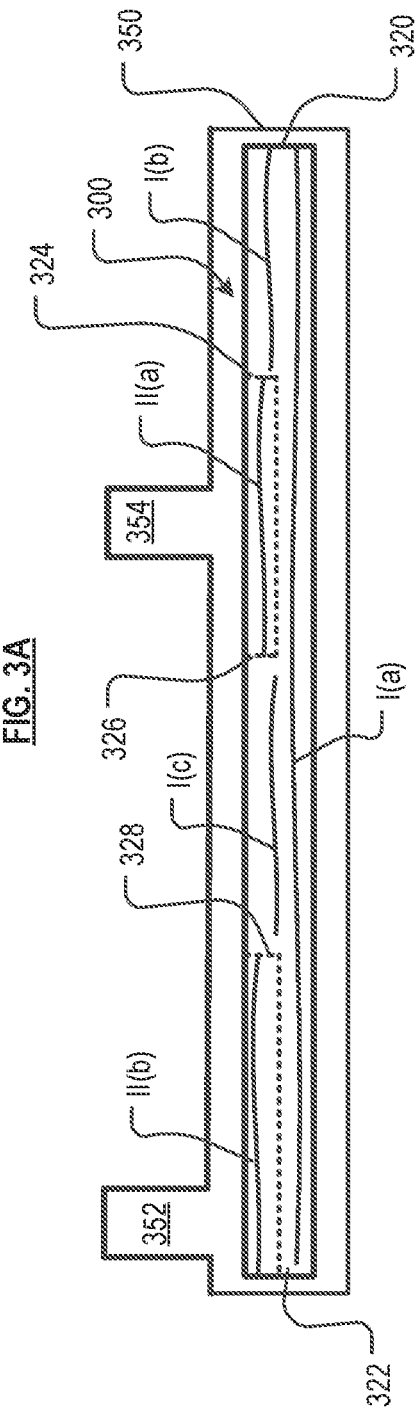
FIG. 3A depicts an embodiment of a hybrid preform in a mold cavity.
Figure 3B:
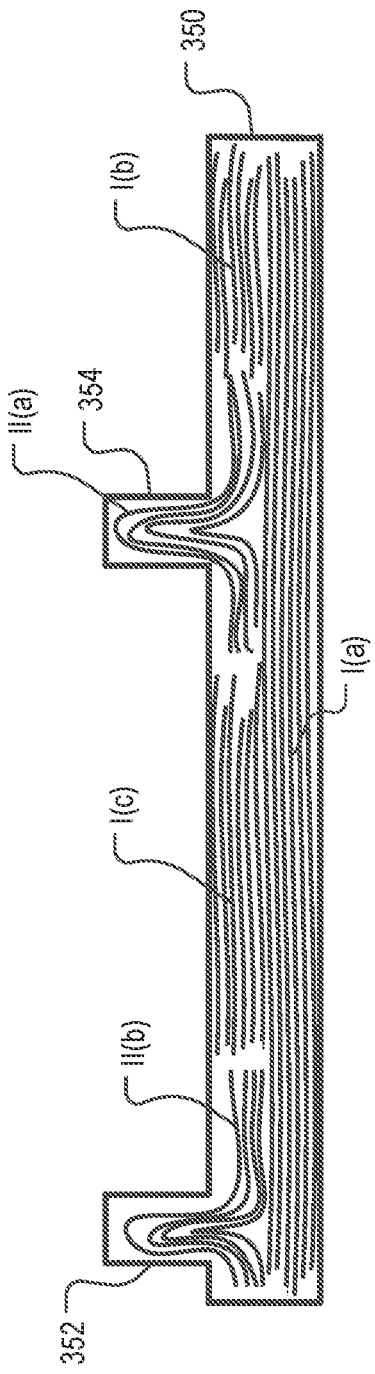
FIG. 3B depicts some of the fibers from the hybrid preform of FIG. 3A flowing during molding operations.

Referring now FIGS. 3A and 3B, some categories of fibers arising from the use of hybrid preforms include:

| Fiber Designation (for FIGs. 3A and 3B) | No. of Cut Ends | No. of Partial Cuts | Is a Cut End proximal to a Feature? | Is a Partial Cut proximal to a Feature? | Is any part* of the fiber proximal to a feature | Feature or Non-Feature Fiber? |
|---|---|---|---|---|---|---|
| I(a) | 2 | 0 | No | — | No | Non-feature |
| I(b) | 1 | 1 | No | No | No | Non-feature |
| I(c) | 0 | 2 | — | No | No | Non-feature |
| II(a) | 0 | 2 | — | No | Yes | Feature |
| II(b) | 1 | 1 | Yes | No | No | Feature |

*Any part other than the cut ends or partial cuts.

Hybrid preform 300 is depicted in mold cavity 350 in FIG. 3A. The mold cavity includes features 352 and 354, which are vented (vents not depicted). The hybrid preform includes first cut end 320, second cut end 322, and three partial cuts 324, 326, and 328. By virtue of location of the cut ends and the partial cuts, and the combinations thereof, with respect to features 352 and 354, each of the five fiber types referenced above—fibers I(a), I(b), I(c), II(a), and II(b)—is depicted. Only a single fiber of each type is depicted in FIG. 3A, it being understood that there will typically be thousands of each of such fibers in the mold.

Fibers II(a) result from the partial cuts 324 and 326. Referring additionally to FIG. 3B, both of these partial cuts are in the proximity of vented feature 354. During molding operations, at least a portion of many of fibers II(a) will flow into feature 354, due to the relatively lower pressure in that feature relative to the pressure in the main portion of mold cavity 350. Referring to the aforementioned definitions, fibers II(a) are therefore characterized as "feature fibers." As previously noted, the ability of such fibers to flow is influenced by the diameter of the fibers as well as the melt viscosity of the polymer resin.

Fibers II(b) result from partial cut 328 and are defined between that partial cut and cut end 322. Because partial cut 328 and cut end 322 are in the proximity of vented feature 352, at least a portion of many of fibers II(b) will flow into or at least towards feature 352, due to the relatively lower pressure in that feature relative to the pressure in the main portion of mold 350. Fibers II(b) are therefore characterized as "feature fibers." It is notable that in some embodiments, it is possible that only one end of fibers II(b) will displace from their initial position during molding. That is, rather than a middle portion of fibers II(b) being drawn into feature 352 (as depicted), only the end of some of fibers II(b) resulting from partial cut 328 flow toward or into feature 352.

Fibers I(c) result from the two partial cuts 326 and 328. It is notable that one end of each of fibers I(c) is substantially no further from feature 352 than the adjacent end of fibers II(b), and the other end of each of fibers I(c) are substantially no further from feature 354 than the adjacent end of fibers II(a). Yet, due to the presence of fibers II(a) in feature 354 and fibers II(b) in feature 352, fibers I(c) cannot move into either of these features. Furthermore, with relatively low pressure on both ends of fibers I(c), there is no driving force for fibers I(c) to flow in one particular direction; that is, either towards feature 352 or feature 354. Consequently, fibers I(c) tend not to flow (or there is little "net" flow, as discussed below) and are therefore categorized as "non-feature fibers."

As fibers II(a) flow into feature 354 and fibers II(b) flow into feature 352, a gap will be created between the ends of those two groups of fibers and the ends of fibers I(c). This implicates factor (ii), above; that is, with no fibers in the immediate vicinity of either end of fibers I(c), there will be some flow of some of fibers I(c) toward the nearest end of the II(a) fibers and some flow of other of fibers I(c) toward the nearest end of the II(b) fibers. But there will be minimal net flow of fibers I(c).

Fibers I(b) result from partial cut 324 and are defined between that partial cut and cut end 320. Due to the presence of fibers II(a) in feature 354, fibers I(b) cannot flow into this feature. Fibers I(b) are therefore "non-feature fibers." As fibers II(a) move into feature 354, a gap will be created between the one end of fibers II(a) and the one end of fibers I(b). Consequently, there will be some flow of fibers I(b) towards the one receding end of fibers II(a).

Fibers I(a), which have no partial cuts and extend from cut end 320 to cut end 322 will not flow for several reasons, not the least of which being that they extend for the full length of mold cavity 350. Moreover, fibers II(a) and II(b) are present in features 352 and 354. Thus, fibers I(a) are well constrained. Additionally, fibers I(a) are not proximal to the features and less affected by any pressure differentials caused by the venting of such features. Consequently, fibers I(a) are "non-feature fibers."

Figure 4:
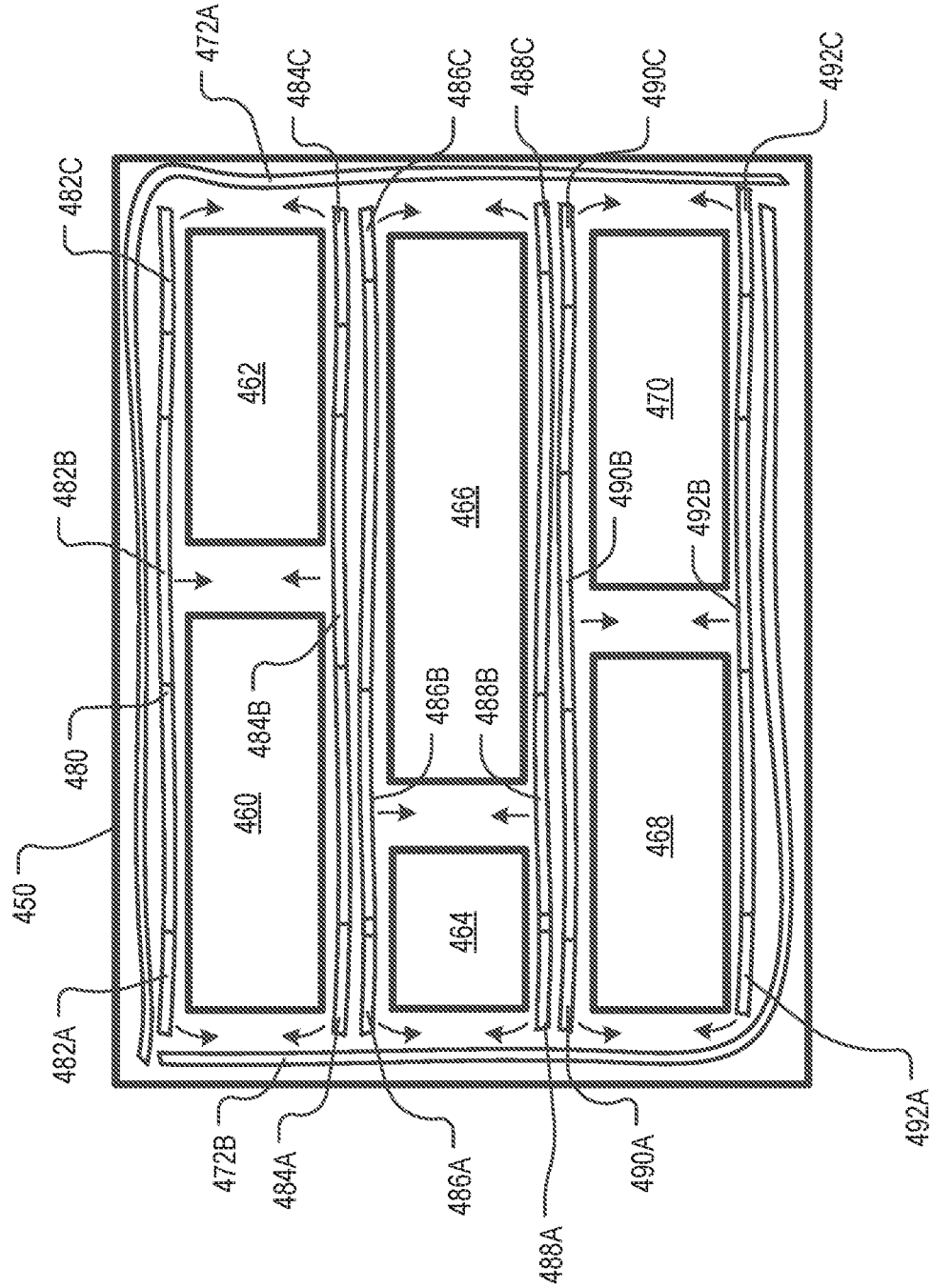
FIG. 4 depicts the use of hybrid preforms in a complex mold cavity.

FIG. 4 depicts complex mold cavity 450 including blocks 460, 462, 464, 466, 468, and 470. The presence of these blocks will produce a part having a grid-like pattern, with openings formed at the location of the blocks. In the embodiment depicted in FIG. 4, plural "standard" fiber-bundle-based preforms (i.e., no partial cuts) and plural hybrid preforms are used to form a grid-like part.

Standard preforms 472A and 472B are shaped to provide a perimeter of continuous fiber. The remaining preforms are hybrid preforms, which include partial cuts 480 and which, by virtue of positioning, create feature fibers that will flow into the offset "vertical" regions between blocks 460 and 462, 464 and 466, and 468 and 470, and into/towards the "vertical" regions between the outer edges of such blocks and the sides of the mold cavity. The "vertical" regions are vented (vents not depicted) to create a pressure gradient that promotes flow thereto. The numbered segments of the hybrid preforms contain the flowing "feature fibers." That is, segments 482A, 482B, 482C, 484A, 484B, 484C, 486A, 486B, 486C, 488A, 488B, 488C, 490A, 490B, 490C, 492A, 492B, and 492C include feature fibers. The arrows depict the flow vectors for the feature fibers, indicating where they will flow. The unnumbered segments of each hybrid preform represent "non-feature fibers that do not flow to any appreciable extent.

It is notable that continuous (unsevered) fibers present "below" each segment of feature fibers in FIG. 4 have been omitted for clarity. To the extent feature fibers are flowing towards a region, the continuous fibers will not flow, such that fibers will be present throughout the mold cavity (and the part being fabricated). By appropriately partially cutting and sizing the hybrid preforms, the fibers that are intended to flow will be situated proximal to regions at which fiber flow is desired once placed into the mold.

Figure 5A:
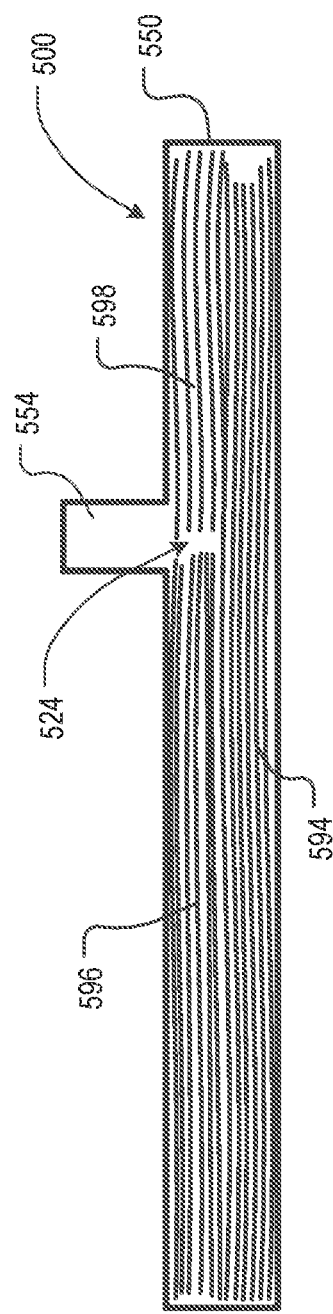
FIG. 5A depicts an alternative embodiment wherein a hybrid preform includes a single partial cut.
Figure 5B:
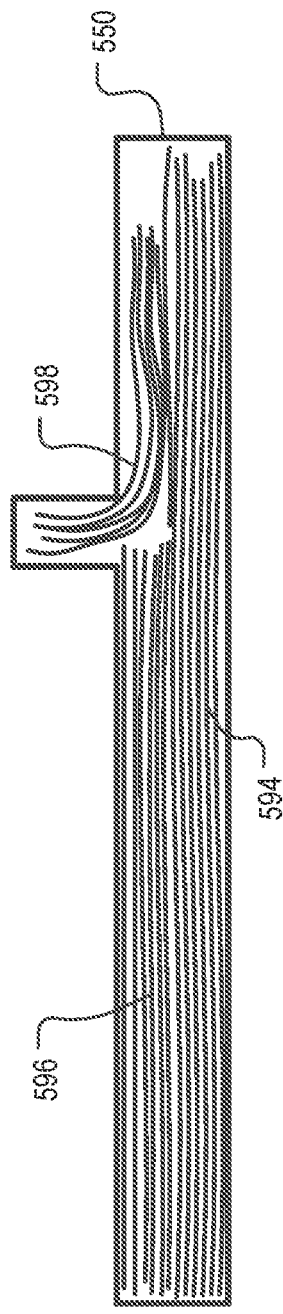
FIG. 5B depicts the flow, under compression molding conditions, of the shorter segments of the discontinuous fiber created by the single partial cut in the hybrid preform.

FIGS. 5A and 5B depict an alternative embodiment of the invention, wherein hybrid preform 500 includes single partial cut 524. Because feature 544 is located relatively close (i.e., less than about 50 mm from one end of hybrid preform 500, fibers 598 resulting from partial cut 524 are flowable, assume other parameters (e.g., fiber diameter, resin type, etc.) support such flow. It is notable that fibers 596 resulting from partial cut 524 are substantially longer than fibers 598, and will not flow to any appreciable extent, since it is bound in place by fluid shear. FIG. 5B depicts movement of fibers 598 into feature 554 under compression molding conditions of elevated temperature (i.e., sufficient to melt the resin) and pressure (e.g., typically in a range of about 1000 to 3000 psi).

In the scenario depicted in FIGS. 5A and 5B, wherein there are relatively long fibers with an end near to a feature, resin can separate from the fibers (since they may not flow) and flow beyond them fibers. This can create what may be undesirable resin-rich/fiber-poor regions in the resulting part.

In addition to the length of the feature fibers, and the proximity of these fibers to a feature of interest, other parameters affect the flowability of feature fibers. For example, as previously noted, it has been found that certain resins promote flowability better than others, and within the acceptable range of fiber thickness (i.e., about 1 to 100 microns), there is a preference for relatively thinner fibers (i.e., about 1 to 20 microns).

It is to be understood that the disclosure describes a few embodiments and that many variations of the invention can easily be devised by those skilled in the art after reading this disclosure and that the scope of the present invention is to be determined by the following claims.

What is claimed:

1. A method comprising:
providing a bundle of fibers, wherein the fibers in the bundle are unidirectionally aligned and infused with resin, the bundle of fibers having a first end;
forming a first partial cut at a first location along the bundle of fibers, the first partial cut extending partially through a transverse cross section of the bundle of fibers at the first location;
forming a second partial cut at a second location along the bundle of fibers, the second partial cut extending partially through a transverse cross section of the bundle of fibers at the second location, wherein the first and second partial cuts are spaced apart from one another by a first length;
forming a cut that extends completely through a transverse cross section of the bundle of fibers at a third location, the cut severing the bundle of fibers at the third location, the severing resulting in a severed segment having a second length defined between the third location and the first end, wherein the severed segment defines a hybrid preform, and wherein the hybrid preform includes the first partial cut and the second partial cut and wherein the fibers in the hybrid preform include:
(a) a first group of aligned fibers having the first length; and
(b) a second group of aligned fibers having the second length.

2. The method of claim 1 wherein the first length, and a depth of each of the first partial cut and the second partial cut determines a volume of the first group of aligned fibers, wherein the volume of the first group of aligned fibers is based on a volume of a first feature of a mold cavity.

3. The method of claim 1 comprising placing an assemblage including the hybrid preform in a mold cavity, the mold cavity having a first feature, wherein a volume of the first feature is less than about five percent of an overall volume of the mold cavity.

4. The method of claim 3 wherein the assemblage is positioned so that at least one of the first partial cut, the second partial cut, the first group of fibers, the cut, or the first end is proximal to the first feature.

5. The method of claim 3 comprising subjecting the assemblage to (a) heat energy to elevate temperature sufficiently to melt the resin, and (b) elevated pressure, wherein at least some of fibers in the first group of fibers flow to the first feature.

6. The method of claim 5 wherein the assemblage includes preforms that do not include partial cuts, and wherein the method comprises applying more heat energy to the assemblage proximal to the hybrid preform to promote the resin in the first group of fibers to melt before the resin in the second group of fibers.

7. The method of claim 1 wherein the fibers have a diameter in a range of about 1 micron to about 20 microns.

8. The method of claim 1 wherein the resin is selected from the group consisting of polycarbonates and nylons.

9. The method of claim 1 further comprising bending the bundle of fibers between the first end and the third location.

10. A method comprising:
positioning a hybrid preform in a mold cavity, the hybrid preform comprising a bundle of aligned fibers infused with resin, and having a first end, a second end, and at least one partial cut, the at least one partial cut extending partially through a transverse cross section of the bundle of fibers at a first location, wherein the at least one partial cut segregates the bundle of fibers into at least three groups of fibers, including:

(a) a first group of fibers that extend from the first end to the at least one partial cut,
(b) a second group of fibers that extend from the second end to the at least one partial cut, and,
(c) a third group of fibers that extend from the first end to the second end, wherein fibers in the first group are shorter than fibers in the second group;

melting the resin and subjecting the hybrid preform to pressure of at least about 1000 pounds per square inch; and reducing pressure in a first region of the mold cavity, thereby causing fibers in the first group to flow toward the first region, wherein there is substantially no flow of fibers in the second group and the third group.

11. The method of claim 10 wherein the mold cavity has a first feature at the first region, wherein a volume of the first feature is less than about five percent of an overall volume of the mold cavity.

12. The method of claim 11 wherein positioning the hybrid preform in the mold cavity comprises positioning the hybrid preform so that the at least one partial cut is proximal to the first feature.

13. The method of claim 10 wherein the fibers in the first group have a length that is less than about 50 millimeters.

14. The method of claim 10 wherein the resin is a thermoplastic polymer.

15. A method comprising:
forming a partial cut at a first location along a bundle of unidirectionally aligned fibers that are infused with resin, the partial cut extending partially through a transverse cross section of the bundle of fibers at the first location, wherein the partial cut is spaced apart from a first end of the bundle of unidirectionally aligned fibers by a first length;

forming a cut that extends completely through a transverse cross section of the bundle of fibers at a second location, the cut severing the bundle of fibers at the second location, the severing resulting in a severed segment defining a hybrid preform, wherein:
(a) the partial cut is spaced apart from the second location by a second length,
(b) the hybrid preform has a third length defined between the second location and the first end, and
(c) wherein the fibers in the hybrid preform include:
   (i) a first group of aligned fibers having the first length,
   (ii) a second group of aligned fibers having the second length, and
   (iii) a third group of aligned fibers having the third length.

16. The method of claim 15 wherein the first length is different from the second length.

17. The method of claim 15 wherein the resin comprises a thermoplastic polymer.

18. The method of claim 15 comprising forming an assemblage including the hybrid preform.

19. The method of 18 comprising placing the assemblage into a mold cavity and forming a part in accordance with compression molding protocols.

20. The method of claim 19 comprising positioning the assemblage so that the partial cut in the hybrid preform is proximal to a feature of the mold cavity.

* * * * *